United States Patent
Wong

(10) Patent No.: US 12,039,542 B1
(45) Date of Patent: Jul. 16, 2024

(54) SYSTEMS AND METHODS FOR ASSIGNING CARD-SPECIFIC ALERTS TO PAYMENT CARDS

(71) Applicant: Wells Fargo Bank, N.A., San Francisco, CA (US)

(72) Inventor: Sirena Jean Wong, Moraga, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/932,096

(22) Filed: Sep. 14, 2022

(51) Int. Cl.
*G06Q 20/40* (2012.01)
*G06Q 20/34* (2012.01)
*G06Q 20/36* (2012.01)

(52) U.S. Cl.
CPC ....... *G06Q 20/4097* (2013.01); *G06Q 20/351* (2013.01); *G06Q 20/36* (2013.01)

(58) Field of Classification Search
CPC ... G06Q 20/4097; G06Q 20/351; G06Q 20/36
USPC .......................................................... 705/41
See application file for complete search history.

(56) References Cited

U.S. PATENT DOCUMENTS

| | | | |
|---|---|---|---|
| 8,180,296 B2 | 5/2012 | Flaherty | |
| 9,489,671 B2 | 11/2016 | Zhou et al. | |
| 10,282,727 B2 | 5/2019 | Van Os et al. | |
| 10,445,736 B2 * | 10/2019 | Kohli | G06Q 20/40 |
| 10,509,473 B2 * | 12/2019 | Medlen | G06F 3/04886 |
| 10,853,791 B1 * | 12/2020 | Ellis | G06Q 20/325 |
| 11,423,384 B1 | 8/2022 | Philbrick | |
| 11,606,360 B1 | 3/2023 | Rule | |
| 11,688,001 B2 * | 6/2023 | Van Os | G06F 21/604 |
| | | | 705/41 |
| 11,715,095 B2 * | 8/2023 | Regen | H04M 1/0254 |
| | | | 705/41 |

(Continued)

FOREIGN PATENT DOCUMENTS

| | | |
|---|---|---|
| CA | 2835508 A1 | 11/2012 |
| CA | 3007992 A1 | 12/2018 |

(Continued)

OTHER PUBLICATIONS

M. S. Manshad et al., "Haptic-payment: Exploring vibration feedback as a means of reducing overspending in mobile payment", Journal of Business Research, vol. 122, 2021, pp. 88-96 (9 Pages).

*Primary Examiner* — Sara C Hamilton
(74) *Attorney, Agent, or Firm* — K&L Gates LLP

(57) ABSTRACT

Systems, apparatuses, methods, and computer program products are disclosed for a payment card identification method. An example payment card identification method includes: receiving first payment card addition instructions to add a first payment card as a first virtual payment card where the first payment card addition instructions include a first feedback that specifies an identity of the first payment card and first instructions to associate the first feedback with the first virtual payment card; causing execution of the first payment card addition instructions to add the first payment card as the first virtual payment card and associate the first virtual payment card with the first feedback; and causing generation of the first feedback after adding the first payment card as the first virtual payment card and associating the first virtual payment card with the first feedback.

20 Claims, 6 Drawing Sheets

(56) References Cited

U.S. PATENT DOCUMENTS

| | | | |
|---|---|---|---|
| 11,762,535 B1* | 9/2023 | Fakhraie | G06F 3/0482 |
| | | | 705/41 |
| 2014/0195422 A1* | 7/2014 | Zheng | G06Q 20/105 |
| | | | 705/41 |
| 2014/0195423 A1* | 7/2014 | Zheng | G06Q 20/36 |
| | | | 705/41 |
| 2016/0063828 A1* | 3/2016 | Moussette | H04L 51/224 |
| | | | 340/691.5 |
| 2016/0109954 A1 | 4/2016 | Harris | |
| 2017/0091753 A1* | 3/2017 | May | G06Q 20/405 |
| 2017/0308902 A1 | 10/2017 | Quiroga | |
| 2018/0025350 A1* | 1/2018 | Grossman | G06Q 20/36 |
| | | | 705/21 |
| 2018/0158048 A1 | 6/2018 | Narasimhan | |
| 2019/0339804 A1 | 11/2019 | Gleeson | |
| 2021/0224791 A1* | 7/2021 | Gower | G06Q 20/352 |
| 2021/0256504 A1* | 8/2021 | Donald | G06Q 20/3672 |
| 2021/0264748 A1 | 8/2021 | Moussette et al. | |
| 2022/0058612 A1 | 2/2022 | Garrett | |

FOREIGN PATENT DOCUMENTS

| | | | |
|---|---|---|---|
| GB | 2573845 A | 11/2019 | |
| WO | 2019234419 A1 | 12/2019 | |

* cited by examiner

SYSTEMS AND METHODS FOR ASSIGNING CARD-SPECIFIC ALERTS TO PAYMENT CARDS

BACKGROUND

Payment cards (e.g., credit cards, debit cards, etc.) may be added into virtual wallets (e.g., open, closed, or semi-closed mobile wallets). Once added, physical copies of these payment cards are no longer required during various transactions (e.g., payments, automated teller machine (ATM) withdrawals, smart car-based transactions, etc.). At any given point in time, a single virtual wallet may store any number of payment cards based on one or more rules set for the virtual wallet.

BRIEF SUMMARY

Generally, a generic/standard alert (e.g., a vibration) is provided when an action (addition, selection, usage, etc.) involving a payment card is detected. For example, the generic alert is provided when a payment card is added into a virtual wallet (e.g., a virtual wallet application on a smartphone, a virtual wallet application installed on and/or remotely linked to a smart car's infotainment system, etc.). The same generic alert is also provided when a different payment card in the same virtual wallet is used for a transaction. As mentioned above, multiple payment cards may be stored in a single virtual wallet (e.g., based on one or more rules set for the virtual wallet). All of these stored payment cards may be different (e.g., a combination of credit cards, debit cards, cards from different issuers, etc.). Thus, the inventor has realized that use of the same generic alert for all of these payment cards misses an important opportunity to provide additional information, such as an identity of payment card that is associated with one or more detected actions.

Systems, apparatuses, methods, and computer program products are disclosed herein for payment card identification. Embodiments herein allow each payment card in a virtual wallet to be associated with a custom/customized alert (e.g., a card-specific alert) that is provided when a payment card is selected, used, or added to a virtual wallet. Association of custom alerts advantageously allows the identity of a payment card associated with one or more of these actions to be easily identifiable. For example, as a practical application of embodiments herein, a card-specific alert may allow an owner of a virtual wallet to easily determine that a credit card (rather than a debit card) has been used for an ATM cash withdrawal transaction. Since the payment card owner may not wish to incur a cash advancement fee, the owner may easily cancel (e.g., reverse) the transaction and initiate a new transaction using a debit card. As this example illustrates, embodiments herein directly improve upon the field of virtual payment technology where conventional processes (discussed above) provide no way to distinguish between different payment cards.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
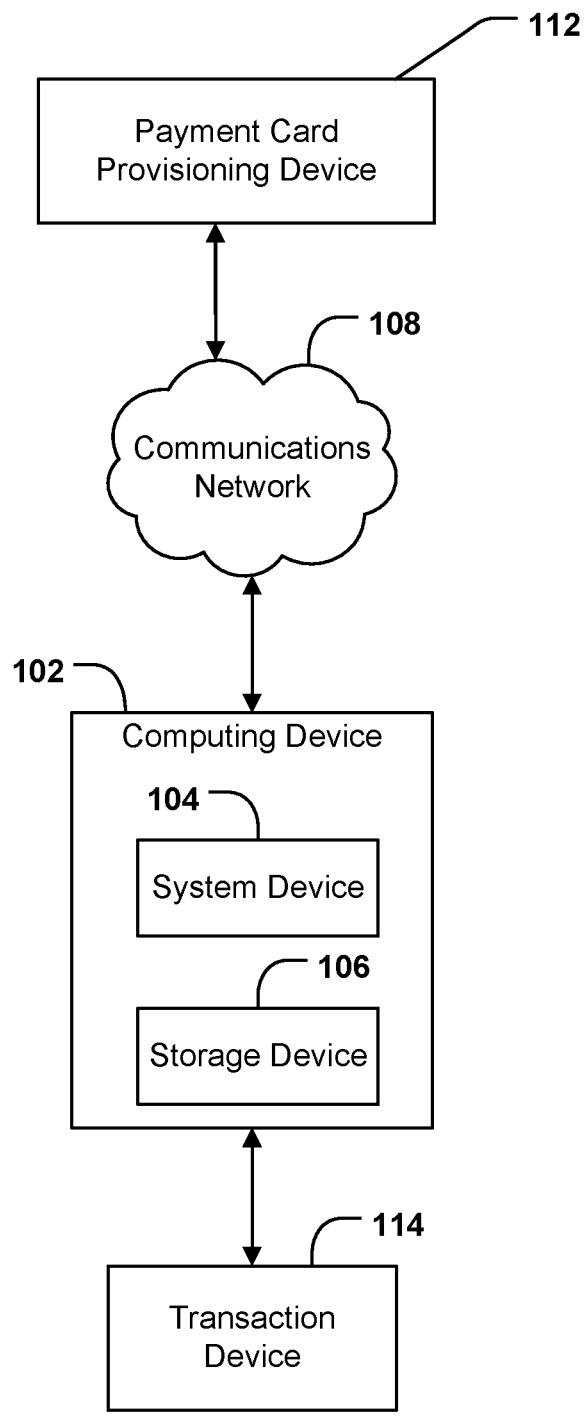
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Methods, apparatuses, systems, and computer program products are described herein that provide for payment card identification. Traditionally, there is no way to determine from an alert which payment card within a virtual wallet is being selected or used. There is also no way to determine, from an alert, which payment card is being added to the virtual wallet.

In contrast to these conventional techniques in the field of virtual payment technology (e.g., mobile payment technology), example embodiments described herein provide user-customized, card-specific alerts that allow easy distinction between one or more payment cards associated with (e.g., stored or being added into) a virtual wallet. Said another way, use of a card-specific alert allows easier identification of an identity of a payment card in the virtual wallet. In some embodiments, the identity of a payment card may refer, in various embodiments, to any one or a combination of: a payment card name (or nickname); a payment card issuer; a payment card co-branded partner; a payment card type (e.g., credit or debit, payment network partner (such as Visa, Mastercard, American Express, or Discover), and/or specific payment cards issued by companies and/or financial institutions (such as the Wells Fargo Autograph[SM] Card, the Wells Fargo Active Cash® Card, the Wells Fargo Reflect® Card, etc.)).

In some embodiments, the card-specific alerts may be provided (e.g., generated) by one or more devices associated with the payment cards. These devices may include, but are not limited to: devices storing the virtual wallet used to execute a transaction; point-of-sales devices processing the transaction; automated teller machines (ATMs); etc. A card-specific alert may be generated by any of these devices when a payment card is being selected, used, or added to a virtual wallet. Additionally, the card-specific alerts may comprise customized (e.g., unique) feedback (also referred to herein as simply as "feedback") including haptic (e.g., vibration), audible alert (e.g., audio), or visual patterns. For example, one customized feedback may be three continuous vibrations followed by an audio pattern (e.g., a bell, a ringtone, a song, etc.) while another customized feedback may simply be a single audio pattern with no vibrations, a third customized feedback may comprise the display of three pulses of light, and a fourth customized feedback may be the display of a visual pattern having a color scheme corresponding to the branding of the issuer of the card and an audible alert comprising a tonal sequence (e.g., associated with that entity). Said another way, the customized feedback may have any combination of haptic, audio, and/or visual patterns that would easily allow one or more individuals (e.g., the owner of the payment cards/virtual wallet, any people in the owner's surroundings, etc.) to readily and easily determine an identity of one or more payment cards within the virtual wallet.

In some embodiments, each different payment card in the virtual wallet may be associated with a unique customized feedback. For example, two credit cards provided by the same issuer may each have their own unique customized feedback, both of which will be different from a customized feedback associated with a debit card in the virtual wallet. Alternatively, each type of payment cards (e.g., debit, credit, issuer, co-branded cards, etc.) in the virtual wallet may be configured to have the same customized feedback. For example, all debit cards may be associated with a first customized feedback and all credit cards may be associated with a second customized feedback different from the first customized feedback. As yet another example, all payment cards provided by the same issuer (e.g., Wells Fargo) may be associated with the same customized feedback.

In some embodiments, the customized feedback may be provided from the issuers of the payment card (e.g., sending settings via a network) when a payment card is being added to a virtual wallet. Alternatively, the virtual wallet may include native settings for each added payment card to be associated with a customized feedback. In some embodiments, the customized feedback is selected by the cardholder.

Accordingly, the present disclosure sets forth systems, methods, and apparatuses that provide payment card identification and improve upon conventional payment card storage processes. There are many advantages of these and other embodiments described herein. For instance, as a practical application of embodiments herein, providing card-specific alerts allows owners (e.g., users) of a virtual wallet to easily determine whether the right or wrong payment card is being used for a transaction. This advantageously allows users of virtual wallets to potentially cancel (e.g., reverse) transaction when a wrong payment card is used. More specifically, the generated card-specific alert would be able to let users know when a credit card (rather than an intended debit card) is being used to withdraw cash at an ATM. As yet another practical application, providing card-specific alerts may also allow people in the user's surroundings to easily identify an issuer of the payment card, which advantageously provides the issuer with indirect marketing of their payment cards to potential customers. As a result of the above-discussed advantages, embodiments herein directly improve upon the field of virtual payment technology where conventional processes (discussed above) provide no way to distinguish between different payment cards.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment within which various embodiments may operate. As illustrated, the environment may include a computing device 102 including a system device 104 and a storage device 106, a communications network 108 (e.g., the Internet), a payment card provisioning device 112, and a transaction device 114. Although system device 104 and storage device 106 are described in singular form, some embodiments may utilize more than one system device 104 and/or more than one storage device 106. Additionally, some embodiments of the computing device 102 may not require a storage device 106 at all. Whatever the implementation, the computing device 102, and its constituent system device(s) 104 and/or storage device(s) 106 may receive and/or transmit information via communications network 108 with any number of other devices, such as one or more computing devices (not shown), a payment card provisioning device, and a transaction device.

System device 104 may be implemented as one or more servers, which may or may not be physically proximate to other components of the environment. Furthermore, some components of system device 104 may be physically proximate to the other components of the computing device 102 while other components are not. System device 104 may receive, process, generate, and transmit data, signals, and electronic information to facilitate the operations of the computing device 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the computing device 102. Storage device 106 may store information relied upon during operation of the computing device 102, such as various payment card information (e.g., payment card identity, payment card data, etc.), feedback information (e.g., haptic patterns, audio patterns, visual effects and/or patterns, etc.), and/or other information that may be used by the computing device 102, data and documents to be analyzed using the computing device 102, or the like. In addition, storage device 106 may store control signals, device characteristics, and access credentials enabling interaction between the computing device 102 and one or more of the payment card provisioning device 112 or transaction device 114.

The computing device 102 may be embodied by various computing devices known in the art, such as desktop or laptop computers, tablet devices, smartphones, wearable devices (e.g., smartwatches), or the like. For example, the computing device 102 may be a smartphone installed with a virtual wallet (e.g., a mobile wallet application) installed on the smartphone. As yet another example, the computing device 102 may be a smartwatch installed with the virtual wallet. Additional components of the computing device 102 and their respective functions are described in more detail below with reference to apparatus 200 in connection with FIG. 2.

The payment card provisioning device 112 may be embodied by various computing devices known in the art, such as desktop or laptop computers, tablet devices, smartphones, server devices (e.g., a secure data center or other device hosted within the secure network infrastructure of an organization or entity), or the like. For example, the payment card provisioning device 112 may be one or more server device(s) operated by a payment card issuer (e.g., a financial institution such as a bank, credit union, etc.). Additional components of the payment card provisioning device 112 and their respective functions are described in more detail below with reference to apparatus 300 in connection with FIG. 3.

The transaction device 114 may be embodied by various computing devices known in the art, such as desktop or laptop computers, tablet devices, smartphones, server devices (e.g., a secure data center or other device hosted within the secure network infrastructure of an organization or entity), Automated Teller Machines (ATMs), point-of-sale (POS) devices, computing systems included in smart cars, or the like. Moreover, the computing devices 202A-202N need not themselves be independent devices, but may be peripheral devices communicatively coupled to other computing devices. Similar to the computing device 102, the transaction device 114 may be embodied by the components of apparatus 200, which are described in more detail below in connection with FIG. 2.

Although FIG. 1 illustrates an environment and implementation in which the computing device 102 interacts with one or more of the payment card provisioning device 112 and/or the transaction device 114, in some embodiments users may directly interact with the computing device 102 (e.g., via input/output circuitry of system device 104), in which case a separate one of the payment card provisioning device 112 may not be utilized. Whether by way of direct interaction or via a separate one of the payment card provisioning device 112, a user may communicate with, operate, control, modify, or otherwise interact with the computing device 102 to perform the various functions and achieve the various benefits described herein.

Example Implementing Apparatuses

Figure 2:
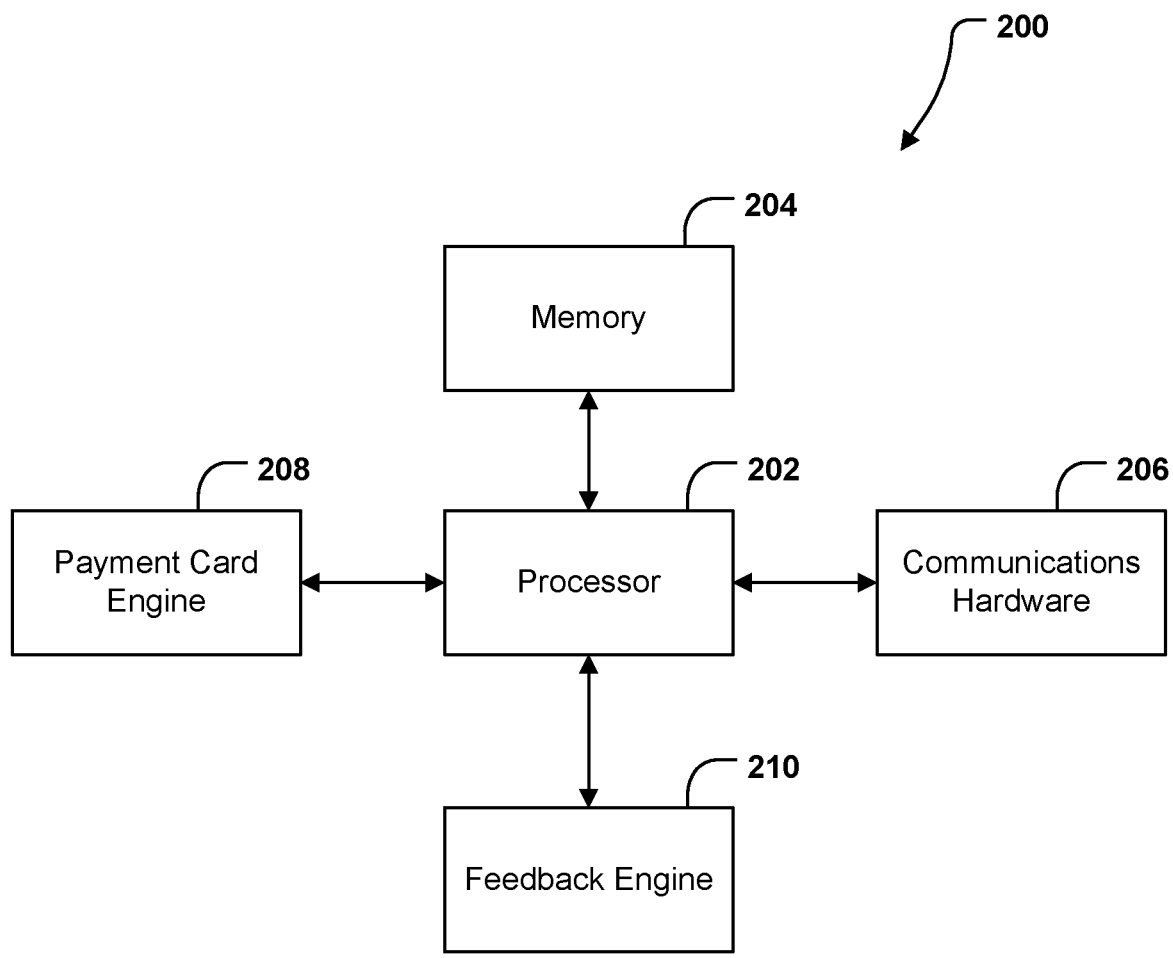
FIG. 2 illustrates a schematic block diagram of example circuitry embodying a device that may perform various operations in accordance with some example embodiments described herein.

System device 104 of the computing device 102 or the transaction device (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206 including input-output circuitry (not shown), payment card engine 208, and feedback engine 210, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 4 and 5.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises payment card engine 208 that identifies one or more payment cards (e.g., using payment card information stored in memory 204). The payment card engine 208 further adds (e.g., provisions) one or more payment cards into a virtual wallet executing on the apparatus 200. The payment card engine 208 may utilize processor 202, memory 204, or any other hardware component included in the apparatus 200 to perform these operations, as described in connection with FIGS. 4 and 5 below. The payment card engine 208 may further utilize communications hardware 206 to gather data from a variety of sources (e.g., payment card provisioning device 112 or storage device 106, as shown in FIG. 1 when apparatus 200 is the system device 104; and payment card provisioning device 112 and computing device 102, as shown in FIG. 1 when apparatus 200 is transaction device 114), may utilize input-output circuitry of the communications hardware 206 to receive data from a user, and in some embodiments may utilize processor 202 and/or memory 204 to identify payment cards stored in (or being added into) a virtual wallet and to add the payment cards into the virtual wallet.

Finally, the apparatus 200 further comprises feedback engine 210 that associates payment cards with customized feedback. The feedback engine 200 further generates one or more of the customized feedback (e.g., generates haptic patterns audio patterns, and/or visual effects using one or more components of the apparatus 200). The feedback engine 210 may utilize processor 202, memory 204, or any other hardware component (e.g., motors, speakers, etc.) included in the apparatus 200 to perform these operations, as described in connection with FIGS. 4 and 5 below. The feedback engine 210 may further utilize communications hardware 206 to gather data from a variety of sources (e.g., payment card provisioning device 112 or storage device 106, as shown in FIG. 1 when apparatus 200 is the system device 104; and payment card provisioning device 112 and computing device 102, as shown in FIG. 1 when apparatus 200 is transaction device 114), may utilize input-output circuitry of the communications hardware 206 to receive data from a user, and in some embodiments may utilize processor 202 and/or memory 204 to generate one or more of the customized feedback.

Although components 202-210 are described in part using functional language, it will be understood that the particular implementations necessarily include the use of particular hardware. It should also be understood that certain of these components 202-210 may include similar or common hardware. For example, the payment card engine 208 and feedback engine 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "engine" with respect to elements of the apparatus therefore shall be interpreted as necessarily including the particular hardware configured to perform the functions associated with the particular element being described. Of course, while the term "engine" should be understood broadly to include hardware, in some embodiments, the term "engine" may in addition refer to software instructions that configure the hardware components of the apparatus 200 to perform the various functions described herein.

Although the payment card engine 208 and feedback engine 210 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the payment card engine 208 and feedback engine 210 are implemented via particular machinery designed for performing the functions described herein in connection with such elements of apparatus 200.

Figure 3:
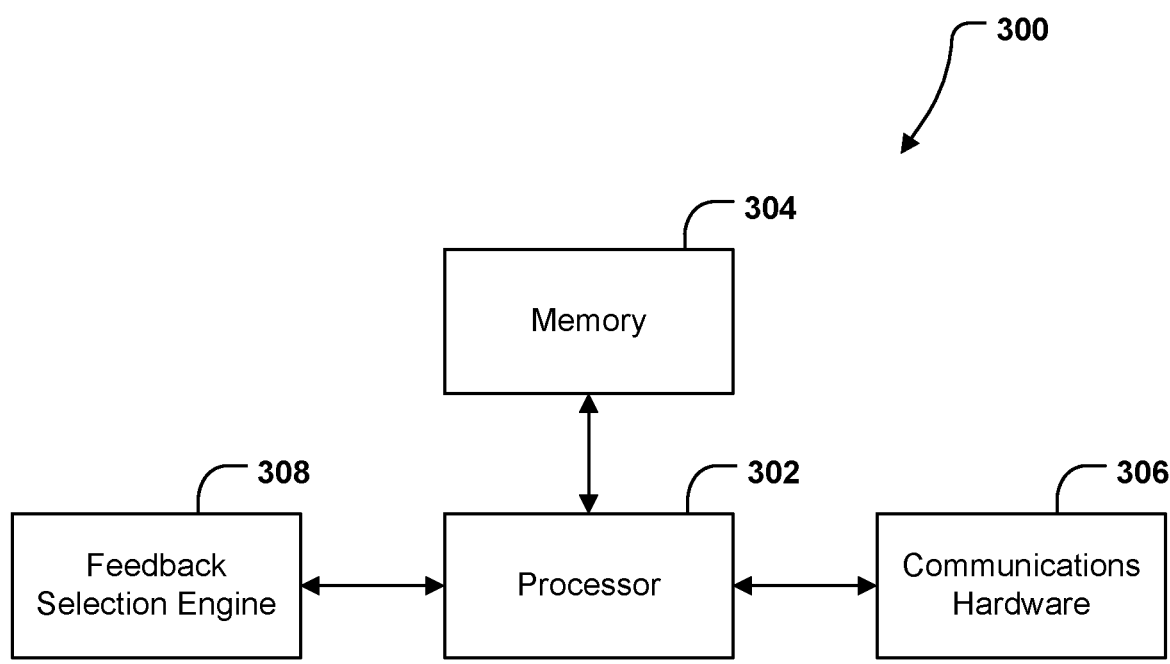
FIG. 3 illustrates a schematic block diagram of example circuitry embodying a payment card provisioning device that may perform various operations in accordance with some example embodiments described herein.

As illustrated in FIG. 3, an apparatus 300 is shown that represents an example payment card provisioning device (described previously with reference to FIG. 1). The apparatus 300 includes processor 302, memory 304, and communications hardware 306, each of which is configured to be similar to the similarly named components described above in connection with FIG. 2. However, the apparatus 300 also includes feedback selection engine 308, which includes hardware components designed for selecting one or more customized feedback (e.g., haptic patterns, audio patterns, and/or visual patterns) to be associated with a payment card. The feedback selection engine 308 may utilize processor 302, memory 304, or any other hardware component(s) included in the apparatus 300 to perform these operations, as described in connection with FIG. 6 below. The feedback selection engine 308 may further utilize communications hardware 306 to communicate with computing device 102 (described in reference to FIG. 1), or may otherwise utilize processor 302 and/or memory 304 to associate and store a payment card with a customized feedback.

In some embodiments, various components of the apparatuses 200 and 300 may be hosted remotely (e.g., by one or more cloud servers) and thus need not physically reside on the corresponding apparatus 200 or 300. Thus, some or all of the functionality described herein may be provided by third party circuitry. For example, a given apparatus 200 or 300 may access one or more third party circuitries via any sort of networked connection that facilitates transmission of data and electronic information between the apparatus 200 or 300 and the third party circuitries. In turn, that apparatus 200 or 300 may be in remote communication with one or more of the other components describe above as comprising the apparatus 200 or 300.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204 or memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatuses 200 and 300, example embodiments are described below in connection with a series of flowcharts.

Example Operations

Figure 4:
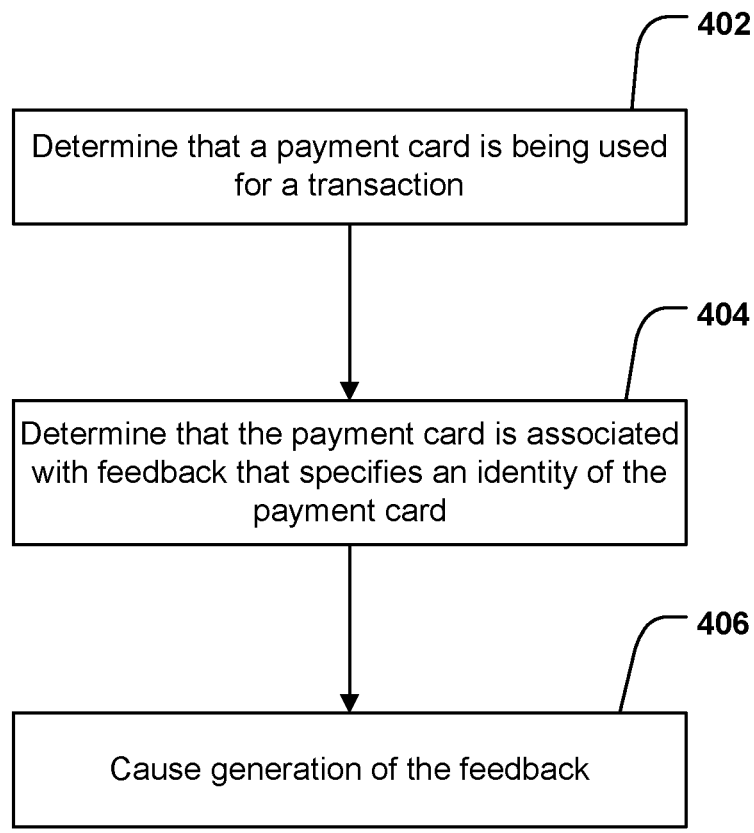
FIG. 4 illustrates an example flowchart for payment card identification, in accordance with some example embodiments described herein.
Figure 5:
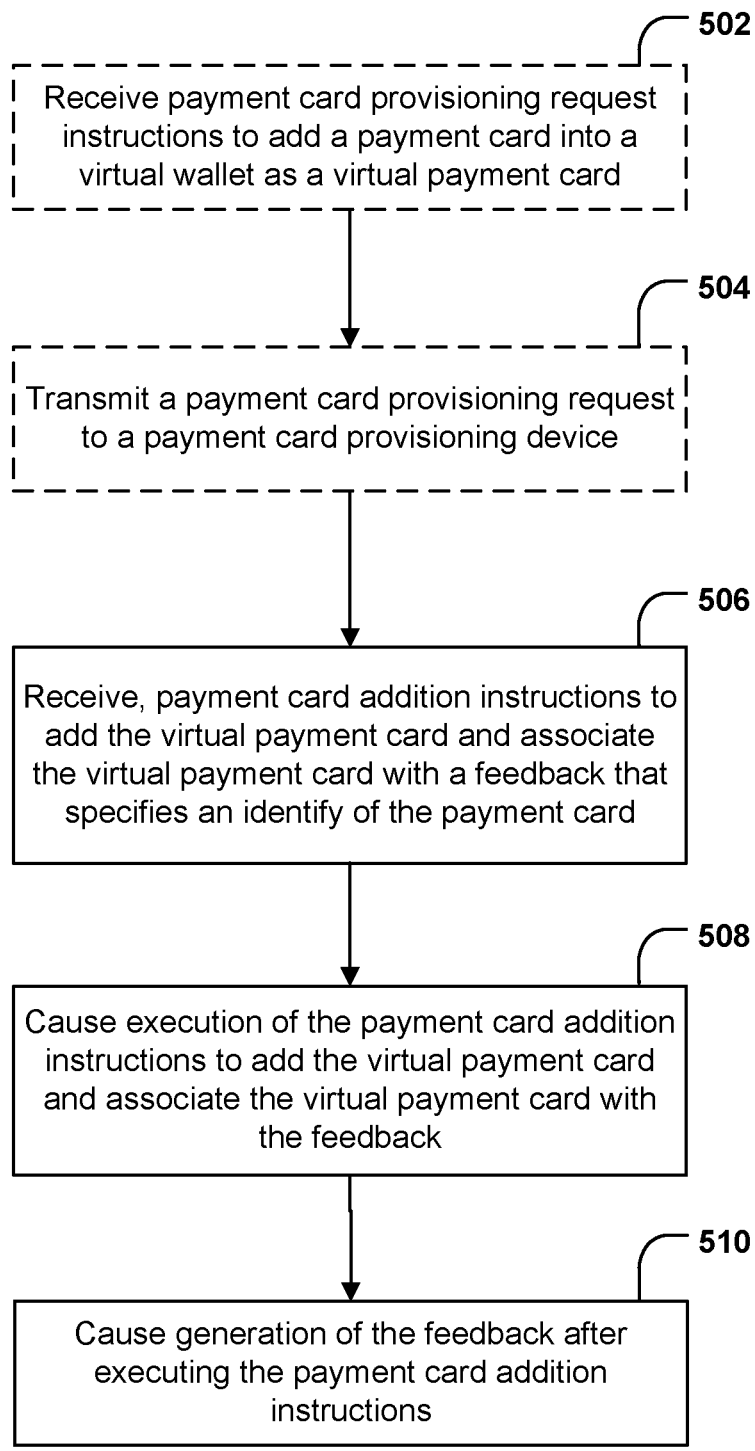
FIG. 5 illustrates an example flowchart for assigning card-specific alerts to payment cards, in accordance with some example embodiments described herein.

Turning to FIGS. 4 and 5, example flowcharts are illustrated that contain example operations implemented by example embodiments described herein. The operations illustrated in FIGS. 4 and 5 may, for example, be performed by system device 104 of the computing device 102 shown in FIG. 1 or by the transaction device 114, both of which may in turn be embodied by an apparatus 200, which is shown and described in connection with FIG. 2. To perform the operations described below, the apparatus 200 may utilize one or more of processor 202, memory 204, communications hardware 206 including input-output circuitry, payment card engine 208, feedback engine 210, and/or any combination thereof. It will be understood that user interaction with the computing device 102 (or the transaction device) may occur directly via input-output circuitry of the communications hardware 206, or may instead be facilitated by a separate one of the payment card provisioning device 112, as shown in FIG. 1, and which may have similar or equivalent physical componentry facilitating such user interaction.

Meanwhile, the various operations described in connection with FIG. 6 may be performed by apparatus 300, which may utilize one or more of processor 302, memory 304, communications hardware 306 including input-output circuitry, feedback selection engine 308, and/or any combination thereof.

Turning first to FIG. 4, example operations are shown for payment card identification.

As shown by operation 402, the apparatus 200 includes means, such as the payment card engine 208, or the like, for making a determination that a payment card is being used for a transaction. The apparatus 200 may be used to execute (e.g., initiate, process, complete, etc.) the transaction (e.g., via a POS, an ATM, etc.). The payment card may be stored as a virtual payment card (e.g., a virtual instance of a physical copy of the payment card) in a virtual wallet installed on the apparatus 200. The payment card engine 208 may be integrated with software on the apparatus 200 comprising the virtual wallet, either holistically as a built-in feature of the virtual wallet, or as a plug-in installed onto the apparatus 200 separately. Either way, receipt of an instruction to use a payment card for a transaction may both trigger use of the payment card for the transaction and may also provide the payment card engine 208 with a corresponding indication of the use of the payment card for the transaction.

In some embodiments, use of a payment card for a transaction may include the act of using a selected payment card (e.g., a default payment card set by a user of the virtual wallet, an actively selected payment card, etc.) to complete the transaction. Additionally, or alternatively, in some embodiments the use of a card for a transaction may include the act of selecting a payment card in the virtual wallet without ever actually using the selected payment card to complete the transaction.

As shown by operation 404, the apparatus 200 includes means, such as payment card engine 208, or the like, for making a determination that the payment card determined in operation 402 is associated with feedback (i.e., the above-discussed customized feedback) that specifies an identity of the payment card. The payment card engine 208 may be integrated with software on the apparatus 200 comprising the virtual wallet, either holistically as a built-in feature of the virtual wallet, or as a plug-in installed onto the apparatus 200 separately. Either way, the virtual wallet may store (e.g., in memory 204 of apparatus 200) the association between the feedback and a payment card as a key-value-pair with the payment card as the key and the associated feedback as the value. As such, when the payment card is determined in operation 402, the payment card engine 208 may parse the information stored by the virtual wallet to find a key-value-pair containing the payment card identified in operation 402 to determine whether the payment card identified in operation 402 is associated with any customized feedback.

As discussed above, in some embodiments, the identity of a payment card may include, but is not limited to, any one or a combination of: a payment card name; a payment card issuer name; a payment card co-branded partner name; a payment card type (e.g., credit or debit). Additionally, in some embodiments, the feedback may include haptic (e.g., vibration), audible alert (e.g., audio), and/or visual patterns.

Finally, as shown by operation 406, the apparatus 200 includes means, such as communications hardware 206, feedback engine 210, or the like, for causing generation of the feedback determined in operation 404. In some embodiments, the feedback engine 210 may cause hardware(s) (e.g., motors, speakers, etc.) of the apparatus 200 (e.g., the input-output circuitry of the communications hardware 206) to generate the feedback in response to (e.g., simultaneously with or at some point in time after) the determination made in operation 402. For example, if the feedback is an audio tone accompanied by multiple vibrations, the feedback engine 210 will cause a speaker of the apparatus 200 to produce the audio tone while simultaneously causing the motor of the apparatus 200 to generate the vibrations while the speaker is playing the audio tone.

In some embodiments, the feedback may be generated for the owner (e.g., user) of the virtual wallet and all individuals in the owner's surroundings. For example, assume that a user is paying for a purchase by tapping his/her mobile phone on a POS system or an ATM. In this example, the feedback may be generated by either the user's mobile phone and/or the POS system or the ATM. As another example, assume that the user is paying for a purchase through interaction of his/her payment card (e.g., tapping, inserting, swiping) with a POS system or an ATM. In this second example, the feedback may be generated by the POS system or the ATM. Alternatively, in some embodiments, the feedback may be generated for a vendor using the transaction device 114 (e.g., a POS). For example, once the payment is processed by the transaction device 114, the transaction device 114 may generate the feedback (e.g., flashing a visual pattern) on a side of the transaction device facing the vendor such that the feedback is only shown to the vendor. This advantageously allows the vendor to determine which payment card types (namely, credit or debit cards here) are being used the most to complete transactions. Having such information may advantageously allow the vendor to make improved decisions to potentially reduce fees associated with payment card payments (e.g., service fees associated with credit cards).

As described above, example embodiments provide methods and apparatuses that enable improved payment card identification. Example embodiments thus provide tools that overcome the problems faced by conventional virtual payment technologies by allowing individuals to readily and easily discern the identity of a payment card when the payment card is being selected and/or used (e.g., for a transaction). This advantageously prevents the wrong (e.g., unintended) payment card from being used during transactions involving use of the mobile wallet (e.g., virtual payment technology).

Turning next to FIG. 5, example operations are shown for assigning card-specific alerts to payment cards. As shown in FIG. 5, some operations of FIG. 5 (e.g., 502 and 504) may be omitted (e.g., optional) in various embodiments contemplated herein.

As shown by operation 502, the apparatus 200 includes means, such as communications hardware 206 or the like, for receiving a set of instructions to add a payment card into a virtual wallet as a virtual payment card (also referred to herein as "payment card provisioning request instructions"). The communications hardware 206 may receive the payment card provisioning request instructions in response to a user's operation to add a payment card into a virtual wallet installed on the apparatus 200.

The payment card provisioning request instructions causes the apparatus 200 to generate a payment card provisioning request to be sent to a payment card provisioning device 112 operated by an issuer of the payment card being added. The payment card provisioning request instructions may also include information for authenticating the user (e.g., single-sign-on (SSO) credentials, etc.) trying to add the payment card.

As shown by operation 504, the apparatus 200 includes means, such as communications hardware 206, or the like, for transmitting the payment card provisioning request to the payment card provisioning device 112. The communications hardware 206 may transmit the payment card provisioning request directly to the payment card provisioning device 112 or may transmit the payment card provisioning request to an intermediary device which, in turn, forwards the request to the payment card provisioning device 112. In some embodiments, such as when the apparatus 200 is unable to connect to a network for transmission of the payment card provisioning request, the payment card provisioning request may be stored locally by the apparatus 200 (e.g., via memory 204) for later transmission to the payment card provisioning device 112.

In some embodiments, the payment card provisioning request may include the information for authenticating the user received in the payment card provisioning request instructions. The payment card provisioning request may also include information associated with the payment card that the user wishes to add to the virtual wallet and information associated with one or more customized feedback that the user wishes to associate with the payment card being added to the virtual wallet.

As shown by operation 506, the apparatus 200 includes means, such as communications hardware 206 or the like, for receiving another set of instructions to add the payment card as a virtual payment card in the virtual wallet (also referred to herein as "payment card addition instructions").

In some embodiments, the communications hardware 206 may receive the payment card addition instructions from the payment card provisioning device 112, and in some embodiments this payment card addition instructions may be received as a token. The token may include information (e.g., payment card art, customized feedback, a digital payment card number, etc.) necessary for a payment card to be used via the virtual wallet without the need for the physical copy of the payment card. The token may also include instructions to add the payment card as a virtual payment card and associate the added virtual payment card with the customized feedback included in the token. Alternatively, the token may not include the customized feedback but rather instructions to associate the payment card with the one or more customized feedback specified in the payment card provisioning request instructions sent to the payment card provisioning device in operation 504.

In some embodiments, the communications hardware 206 may receive the payment card addition instructions from the payment card provisioning device in response to the payment card provisioning request transmitted by the apparatus 200. Alternatively, the payment card addition instructions may be received directly from the payment card provisioning device in response to the user provisioning a payment card to the virtual wallet on the apparatus directly using a graphical user interface (GUI) provided by the payment card provisioning device (e.g., the GUI of the payment card provisioning device is a web-based application of a financial institution being executed on a computing device different from apparatus 200), in which case operations 502 and 504 will be omitted from the operations of FIG. 5. Additionally, when received directly from the user of the apparatus 200, the instructions to add the payment card as a virtual payment card may be omitted from the payment card addition instructions because the virtual payment card already exists in the virtual wallet. For example, the virtual wallet may include native settings (e.g., local settings within the virtual wallet application) allowing users to select customized feedback to be associated with one or more existing virtual payment cards already stored in the wallet. In this example, the payment card addition instructions may only include instructions for associating the selected customized feedback with one or more selected virtual payment cards that are already stored in the virtual wallet.

As shown by operation 508, the apparatus 200 includes means, such as payment card engine 208, or the like, for causing execution of the payment card addition instructions.

In some embodiments, causing execution of the payment card addition instructions includes causing addition of the payment card into the virtual wallet as the virtual payment card, and causing association of the added virtual payment card with customized feedback included in the payment card addition instructions.

Finally, as shown by operation 510, the apparatus 200 includes means, such as communications hardware 206, feedback engine 210, or the like, for causing generation of the feedback (i.e., the customized feedback associated with the virtual payment card in operation 508) after executing the payment card addition instructions. In some embodiments, the feedback engine 210 may transmits instructions to the input-output circuitry of the communications hardware 206 to cause various input-output circuitry (e.g., speakers, motor, etc.) of the communications hardware 206 to produce the customized feedback. For example, if the feedback is an audio tone accompanied by multiple vibrations, the feedback engine 210 will cause a speaker of the apparatus 200 to produce the audio tone while simultaneously causing the motor of the apparatus 200 to generate the vibrations while the speaker is playing the audio tone.

In some embodiments, the customized feedback associated with the virtual payment card in operation 508 is generated (e.g., by the apparatus 200) after the virtual payment card is successfully added to the virtual wallet.

As described above, example embodiments provide methods and apparatuses that enable improved payment card identification. Example embodiments thus provide tools that overcome the problems faced by conventional virtual payment technologies by allowing individuals to readily and easily discern the identity of a payment card being added, and utilize this information for subsequently executed selection or usage of the payment card.

Figure 6:
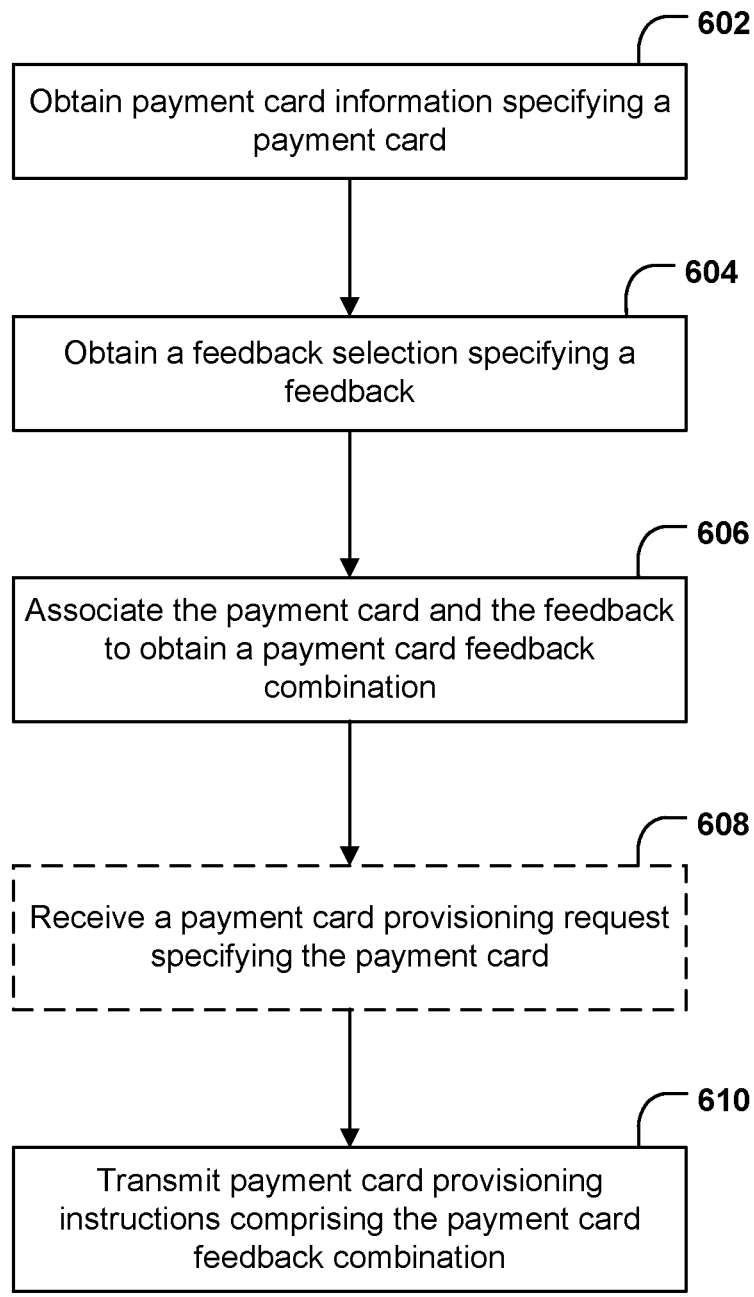
FIG. 6 illustrates another example flowchart for payment card identification using payment card specific alerts, in accordance with some example embodiments described herein.

Finally, turning to FIG. 6, example operations are shown for payment card identification using payment card specific alerts. As shown in FIG. 6, some operations of FIG. 6 (e.g., 608) may be omitted (e.g., optional) without departing from the scope of embodiments herein.

As shown by operation 602, the apparatus 300 includes means, such as communications hardware 306, or the like, for obtaining payment card information indicating a payment card. The communications hardware 306 may obtain the payment card information directly from a user using input-output circuitry of the communications hardware 306. For example, the apparatus 300 may include a GUI (e.g., a web-based application GUI, a mobile application GUI, etc.) with options for a user to select (e.g., using a mouse, a touch pad, etc.) a payment card that the user owns. Once obtained, the communications hardware 306 may transmits the payment card information to the feedback selection engine 308.

In some embodiments, the payment card information may be similar to the payment card identity and may include any one or a combination of: a payment card type (e.g., credit or debit, payment network partner (such as Visa, Mastercard, American Express, or Discover), and/or specific payment cards issued by companies and/or financial institutions (such as the Wells Fargo Autograph$^{SM}$ Card, the Wells Fargo Active Cash® Card, the Wells Fargo Reflect® Card, etc.)). The payment card information may be based on a user's selection of one or more payment cards through an application (e.g., web-based, mobile-based, etc.) issued and managed by the issuer of the payment card.

As shown by operation 604, the apparatus 300 includes means, such as communications hardware 306, feedback selection engine 308, or the like, for obtaining feedback instructions specifying a feedback (i.e., the above-discussed customized feedback) selected by the user. In some embodiments, the feedback instructions may be received in response to a user's selection of one or more haptic patterns, audio patterns and/or visual patterns through the application (e.g., web-based, mobile-based, etc.) issued and managed by the issuer of the payment card. Similar to operation 602, the communications hardware 306 may obtain the feedback instructions directly from a user using input-output circuitry of the communications hardware 306 and transmit the feedback instructions to the feedback selection engine 308. For example, the apparatus 300 may include a GUI (e.g., a web-based application GUI, a mobile application GUI, etc.) with options for a user to select (e.g., using a mouse, a touch pad, etc.) a feedback option to be included as the feedback instructions.

As shown by operation 606, the apparatus 300 includes means, such as feedback selection engine 308, or the like, for associating the payment card and the feedback to obtain a payment card feedback combination. The payment card combination may be a key-value-pair with the payment card being the key and the feedback being the value of the key-value-pair. The key-value-pair may be generated by the feedback selection engine 308 upon receiving the payment card information and the feedback instructions from the communications hardware 306 in operations 602 and 604. In some embodiments, the payment card feedback combination may be stored in the memory 304 of the apparatus 300 as a table of key-value-pairs.

As shown by operation 608, the apparatus 300 includes means, communications hardware 306, or the like, for receiving a payment card provisioning request specifying the payment card obtained in operation 602.

In some embodiments, the payment card provisioning request may be the same payment card provisioning request discussed above in reference to operation 504 of FIG. 5. Upon receipt of the payment card provisioning request, the apparatus 300 may authenticate the identity of the user to determine whether to allow provisioning of the payment card.

Finally, as shown by operation 610, the apparatus 300 includes means, such as communications hardware 306, or the like, for transmitting payment card provisioning instructions.

In embodiments where a particular payment card is not yet added to a virtual wallet, the payment card provisioning instructions may be transmitted in response to receiving the payment card provisioning request in operation 608. The payment card provisioning instructions may include the payment card combination from operation 606 along with instructions for provisioning the payment card indicated in the payment card combination into the virtual wallet. Along with the instructions for provisioning the payment card indicated in the payment card combination into the virtual wallet, the payment card provisioning instructions also includes instructions for associating the feedback indicated in the payment card combination with the payment card that is added to the virtual wallet.

Alternatively, in some embodiments (e.g., where the payment card is already added to the virtual wallet), the payment card provisioning instructions may be transmitted without receipt of any payment card provisioning requests and will instead be transmitted following (and in some cases in response to) creation of the payment card feedback combination. In such cases, operation 608 may be omitted from the operations of FIG. 6. For instance, an application managed by an issuer of the payment card may include functionality that allows owners of payment cards to directly transmit the payment card provisioning instructions to a device installed with a virtual wallet such that the payment card feedback combination is reflected in the virtual wallet (e.g., on an existing virtual payment card in the virtual wallet, as a new virtual payment card to be added into the virtual wallet, etc.).

As described above, example embodiments provide methods and apparatuses that enable improved payment card identification. Example embodiments thus provide tools that overcome the problems faced by conventional virtual payment technologies by allowing individuals to readily and easily discern the identity of a payment card being added, and utilize this information for subsequently executed selection or usage of the payment card.

As these examples all illustrate, example embodiments contemplated herein provide technical solutions that solve real-world problems faced during use of virtual wallets associated with the field of virtual payment technology (e.g., mobile payment technology). And while the inability to identify payment cards through the use of the virtual wallet without actually looking at a screen of a device displaying the virtual wallet has been an issue for decades, the recent advancements in virtual payment technology (e.g., the swipe of a smartwatch over a POS system with the screen of the smartwatch off or not displaying the virtual wallet) has made this problem significantly more acute as more individuals (e.g., consumers) start to adapt the use of virtual payment technology. At the same time, the recently arising ubiquity the above-discussed problem has unlocked new avenues to solving this problem that historically were not available, and example embodiments described herein thus represent a technical solution to these real-world problems.

FIGS. 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for custom alert identification performed by a computing device comprising a processor, communications hardware, payment engine, and feedback engine, the method comprising:

receiving, by the communications hardware, first executable software instructions to add a first virtual payment card to a virtual wallet application that is installed on the computing device;

receiving, by the communications hardware, key-value-pair data comprising a first feedback that specifies an identity of the first virtual payment card as a key and second executable software instructions to associate the first feedback with the first virtual payment card as a value;

executing, by the payment card engine utilizing the processor, the first executable software instructions to add the first virtual payment card;

executing, by the payment card engine utilizing the processor, the second executable software instructions to associate the first virtual payment card with the first feedback; and generating, by a feedback engine utilizing the processor, and based on the key-value-pair data, the first feedback after adding the first virtual payment card and associating the first virtual payment card with the first feedback.

2. The method of claim 1, further comprising:
transmitting, by the communications hardware, a payment card provisioning request to a payment card provisioning device.

3. The method of claim 2, wherein the first executable software instructions and the key-value-pair data are received from the payment card provisioning device in response to transmitting the payment card provisioning request to the payment card provisioning device.

4. The method of claim 1, further comprising:
receiving, by the communications hardware, third executable software instructions to add a second virtual payment card that is different from the first virtual payment card to the virtual wallet application that is installed on the computing device;
receiving, by the communications hardware, second key-value-pair data comprising a second feedback that specifies an identity of the second virtual payment card as a key and fourth executable software instructions to associate the second feedback with the second virtual payment card as a value;
executing, by the payment card engine utilizing the processor, the third executable software instructions to add the second virtual payment card;
executing, by the payment card engine utilizing the processor, the fourth executable software instructions to associate the second virtual payment card with the second feedback; and
generating, by the feedback engine utilizing the processor, and based on the second key-value-pair data, the second feedback after adding the second virtual payment card and associating the second virtual payment card with the second feedback.

5. The method of claim 4, further comprising:
storing, by the payment card engine utilizing the processor, the first feedback and the second feedback in the virtual wallet application that is installed on the computing device.

6. The method of claim 4, wherein the computing device further comprises a motor, wherein generating the first feedback further comprises generating, utilizing the motor, a first haptic pattern, and
wherein generating the second feedback further comprises generating, utilizing the motor, a second haptic pattern.

7. The method of claim 6, wherein the computing device further comprises a speaker, wherein generating the first feedback further comprises generating, utilizing the speaker, a first audio pattern, and
wherein generating the second feedback further comprises generating, utilizing the speaker, a second audio pattern.

8. The method of claim 7, wherein the first haptic pattern is the same as the second haptic pattern and the first audio pattern is different from the second audio pattern.

9. The method of claim 7, wherein the first haptic pattern is different from the second haptic pattern and the first audio pattern is the same as the second audio pattern.

10. The method of claim 1, wherein the identity of the first virtual payment card comprises at least one of a payment card name, a payment card issuer name, and a payment card co-branded partner name.

11. The method of claim 10, wherein the identity of the first virtual payment card further comprises a payment card type.

12. An apparatus for custom alert identification comprising:
communications hardware configured to:
receive first executable software instructions to add a first virtual payment card to a virtual wallet application that is installed on the apparatus, and
receive key-value-pair data comprising a first feedback that specifies an identity of the first virtual payment card as a key and second executable software instructions to associate the first feedback with the first virtual payment card as a value;
a processor;
a payment card engine, utilizing the processor, configured to:
execute the first executable software instructions to add the first virtual payment card, and
execute the second executable software instructions to associate the first virtual payment card with the first feedback; and
a feedback engine, utilizing the processor, configured to:
generate, based on the key-value-pair data, the first feedback after adding the first virtual payment card and associating the first virtual payment card with the first feedback.

13. The apparatus of claim 12, wherein the communications hardware is further configured to transmit a payment card provisioning request to a payment card provisioning device.

14. The apparatus of claim 13, wherein the first executable software instructions and the key-value-pair data are received from the payment card provisioning device in response to transmitting the payment card provisioning request to the payment card provisioning device.

15. The apparatus of claim 12, wherein the communications hardware is further configured to:
receive third executable software instructions to add a second virtual payment card that is different from the first virtual payment card to the virtual wallet application that is installed on the apparatus, and
receive second key-value-pair data comprising a second feedback that specifies an identity of the second virtual payment card as a key and fourth executable software instructions to associate the second feedback with the second virtual payment card as a value,
wherein the payment card engine, utilizing the processor, is further configured to:
execute the third executable software instructions to add the second virtual payment card, and
execute the fourth executable software instructions to associate the second virtual payment card with the second feedback, and
wherein the feedback engine, utilizing the processor, is further configured to;
generate the second feedback after adding the second virtual payment card and associating the second virtual payment card with the second feedback.

16. The apparatus of claim 15, wherein the payment card engine, utilizing the processor, is further configured to:
store the first feedback and the second feedback in the virtual wallet application installed on the apparatus.

17. The apparatus of claim 15, wherein the apparatus further comprises a motor, and wherein the feedback engine is further configured to:
generate, utilizing the motor, a first haptic pattern as part of the first feedback; and
generate, utilizing the motor, a second haptic pattern as part of the second feedback.

18. The apparatus of claim 17, wherein the apparatus further comprises a speaker, and wherein the feedback engine is further configured to:
- generate, utilizing the speaker, a first audio pattern as part of the first feedback; and
- generate, utilizing the speaker, a second audio pattern as part of the second feedback.

19. The apparatus of claim 18, wherein the first haptic pattern is different from the second haptic pattern and the first audio pattern is the same as the second audio pattern.

20. A computer program product for custom alert identification, the computer program product comprising at least one non-transitory computer-readable storage medium storing software instructions that, when executed by a processor of an apparatus, causes the apparatus to:
- receive first executable software instructions to add a first virtual payment card to a virtual wallet application that is installed on the apparatus;
- receive key-value-pair data comprising a first feedback that specifies an identity of the first virtual payment card as a key and second executable software instructions to associate the first feedback with the first virtual payment card as a value;
- execute the first executable software instructions to add the first virtual payment card;
- execute the second executable software instructions to associate the first virtual payment card with the first feedback; and
- generate, based on the key-value-pair data, the first feedback after adding the first virtual payment card and associating the first virtual payment card with the first feedback.

* * * * *